United States Patent
Miller et al.

[15] 3,673,044
[45] June 27, 1972

[54] PRODUCING INTERLAYERS FOR ANTENNA TYPE WINDSHIELDS

[72] Inventors: Alfred H. Miller; Lee F. Johnson, both of Toledo, Ohio

[73] Assignee: Libbey-Owens-Ford Company, Toledo, Ohio

[22] Filed: Sept. 10, 1969

[21] Appl. No.: 856,720

[52] U.S. Cl. ..............156/433, 156/166, 156/391, 219/522, 343/712
[51] Int. Cl. .........................................H01q 1/32
[58] Field of Search ..................343/712, 713, 704; 219/203, 219/522, 544, 546; 156/433, 436, 166, 176, 391

[56] References Cited

UNITED STATES PATENTS

| 2,640,798 | 6/1953 | Langer | 156/436 X |
| 2,813,960 | 11/1957 | Egle et al. | 219/544 X |
| 3,484,584 | 12/1969 | Shaw, Jr. | 343/712 X |

FOREIGN PATENTS OR APPLICATIONS

| 1,145,367 | 3/1969 | Great Britain | 219/522 |
| 1,464,585 | 11/1966 | France | 219/522 |

Primary Examiner—Benjamin A. Borchelt
Assistant Examiner—G. E. Montone
Attorney—Collins and Oberlin

[57] ABSTRACT

A method of and apparatus for preparing plastic sheets, to be used as interlayers in laminated antenna-windshield structures, by feeding a length of wire onto each sheet in a predetermined pattern, progressively heating the plastic in advance of the feeding wire and rolling the fed wire into the heated plastic, and then feeding a second length of wire onto and rolling it into the sheet in an identical but reversed pattern and in close proximity to the first length.

6 Claims, 20 Drawing Figures

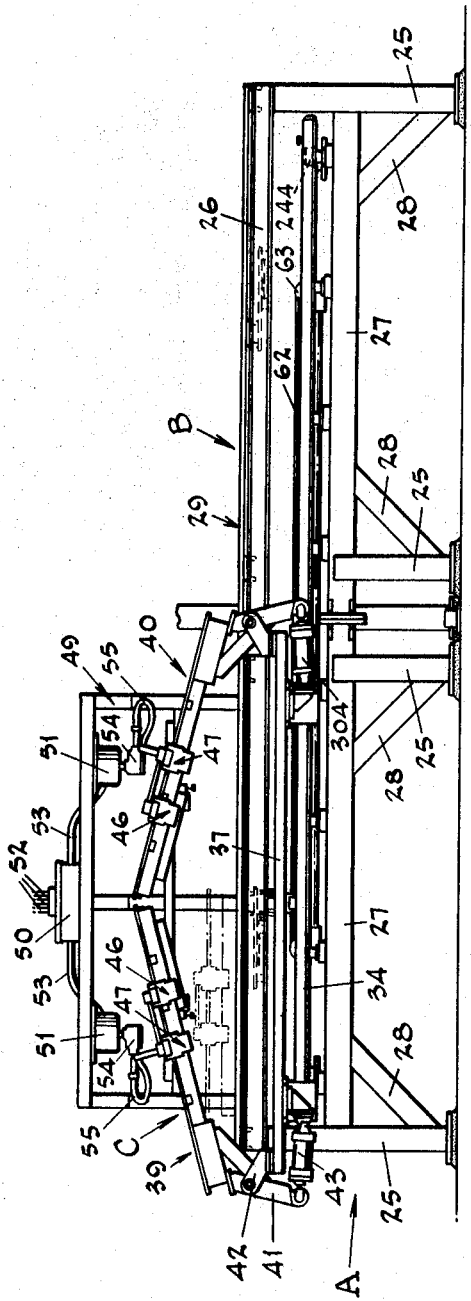
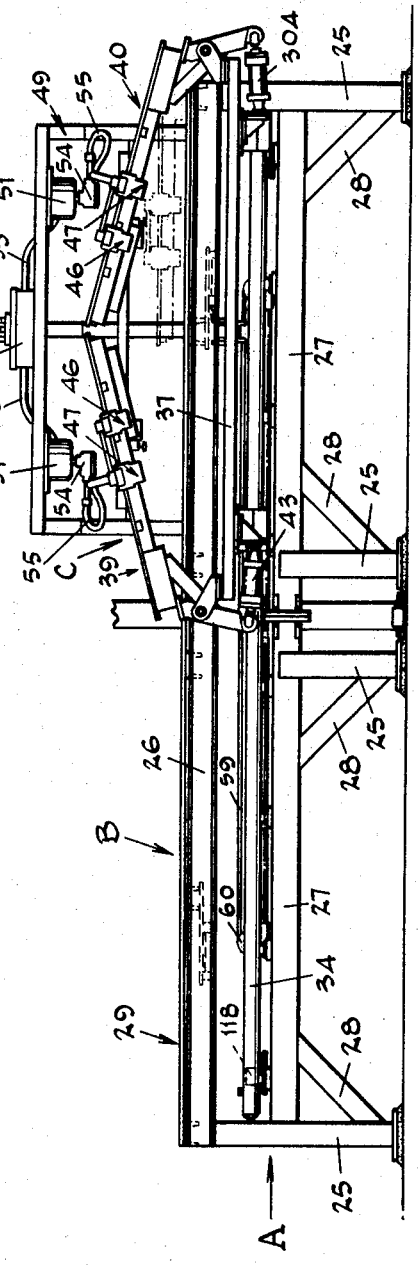

INVENTORS
Alfred H. Miller and
Lee F. Johnson
BY Collins & Oberlin
ATTORNEYS

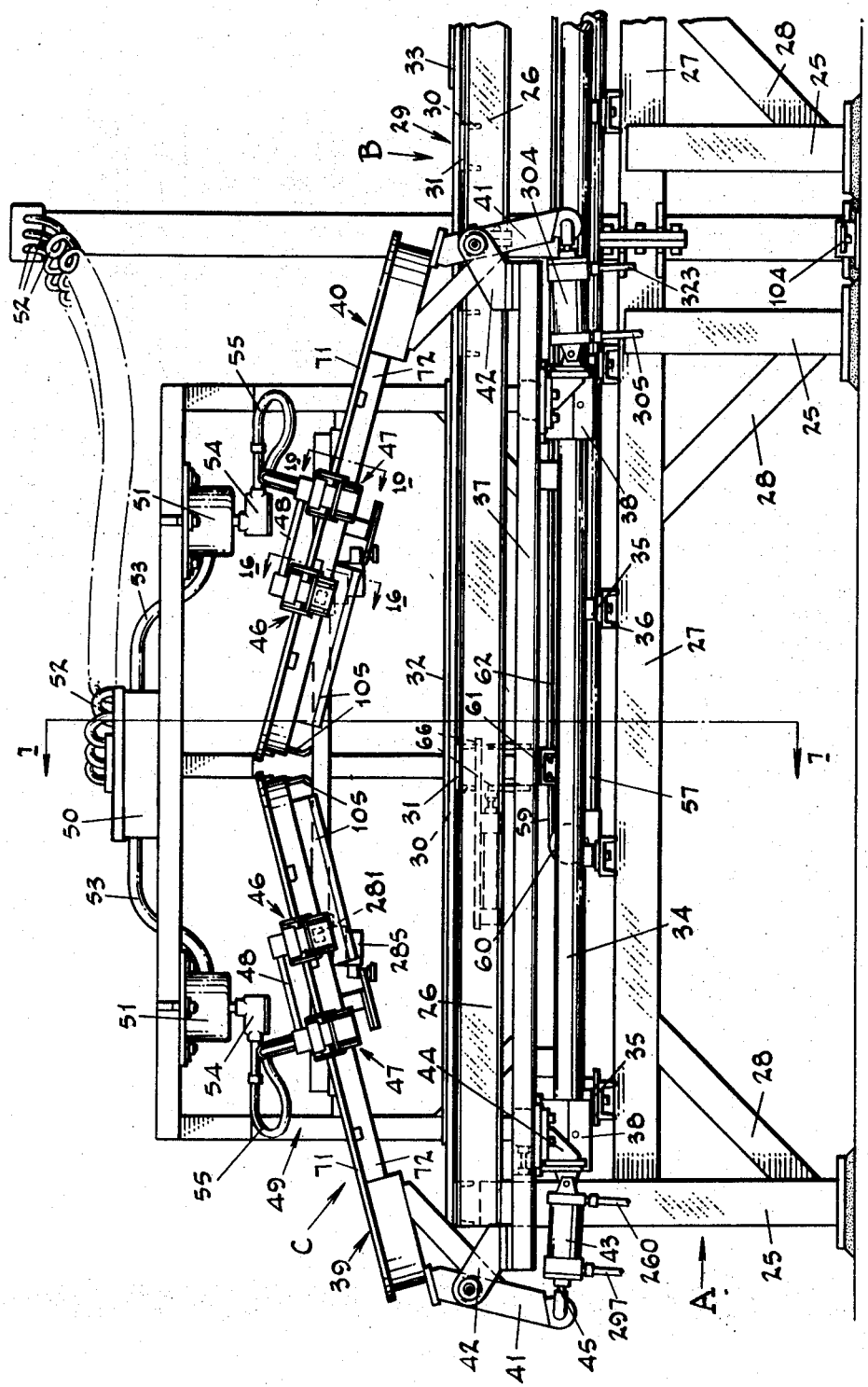

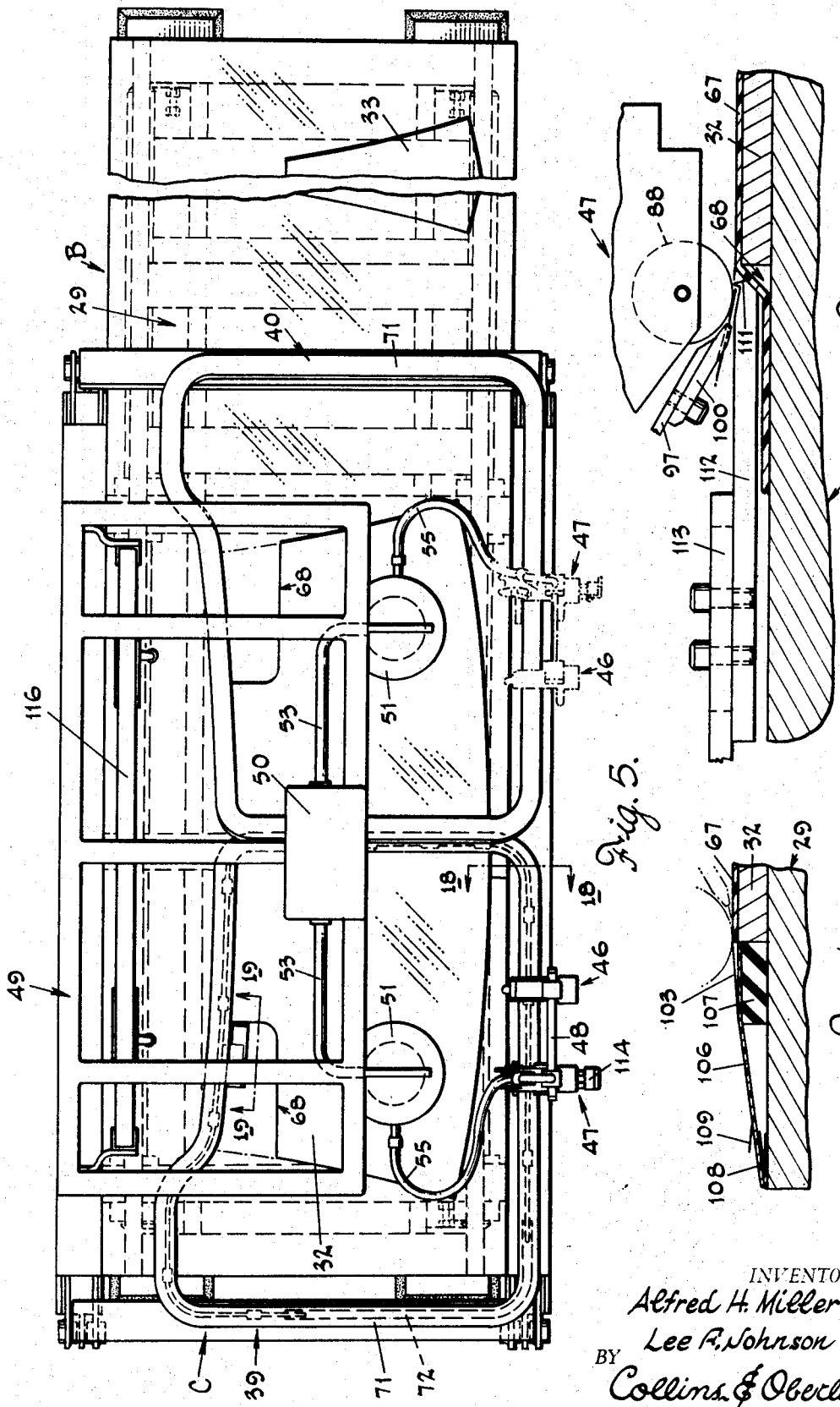

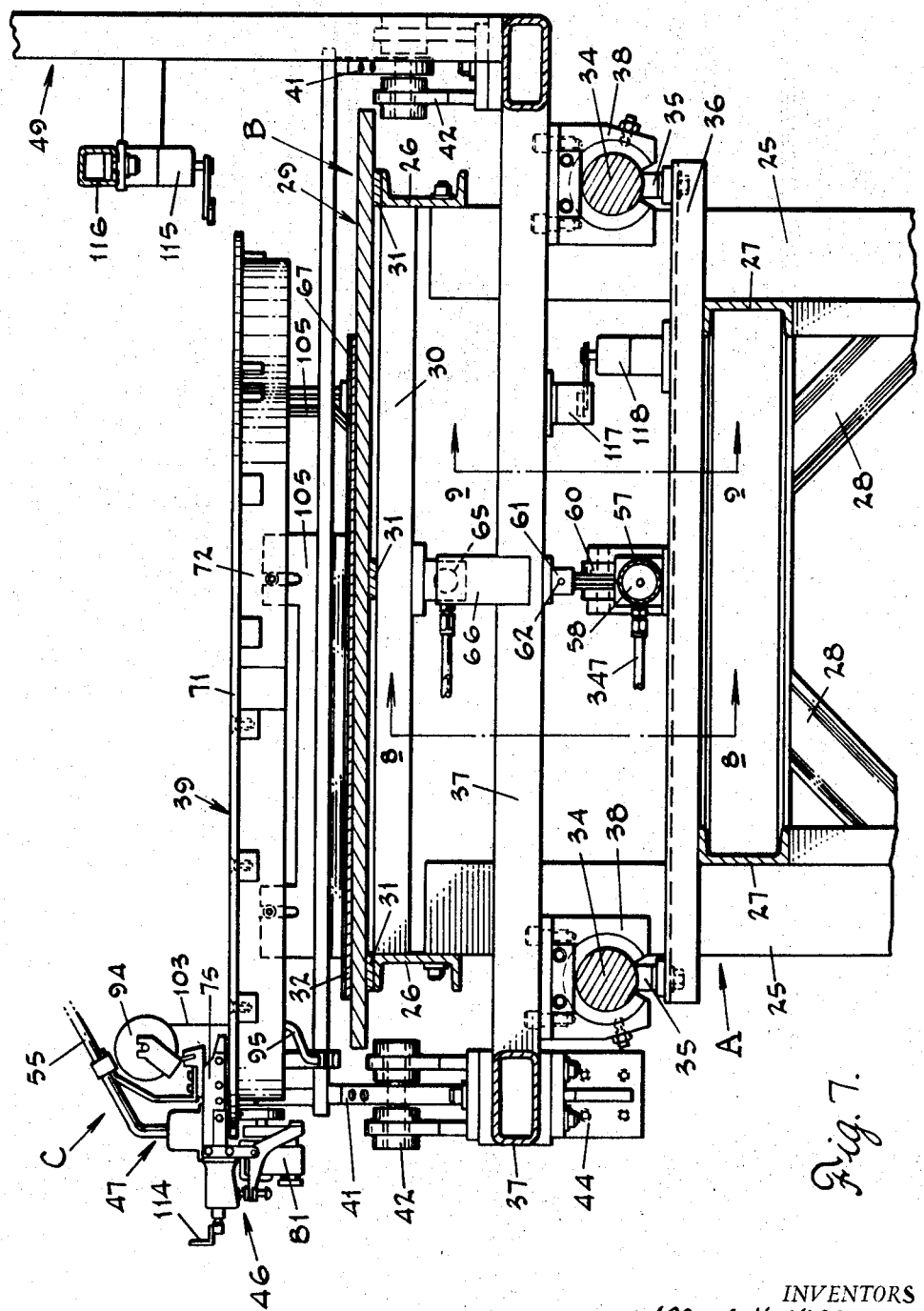

INVENTORS
Alfred H. Miller and
Lee F. Johnson
BY Collins & Oberlin
ATTORNEYS

INVENTORS
Alfred H. Miller and
Lee F. Johnson
BY Collins & Oberlin
ATTORNEYS

INVENTORS
Alfred H. Miller and
Lee F. Johnson
BY Collins & Oberlin
ATTORNEYS

PRODUCING INTERLAYERS FOR ANTENNA TYPE WINDSHIELDS

BACKGROUND OF THE INVENTION

1. Field of the Invention

The present invention relates broadly to the manufacture of conductive glazings for sight openings and more particularly to the combining of interlayer components of plastic and wire in producing laminated glass windshields with built in antennas.

2. Description of the Prior Art

Until very recently automobile antennas were almost exclusively of the familiar "buggy ship" or flexible, telescoping, rod type that are mounted in the right front fender of the car. Currently however so-called antenna-windshields have been developed to a point where they are used in more and more passenger cars. In perhaps their most popular form, the antenna portions of these antenna-windshields are made up of two substantially inverted "L" shaped lengths of wire which are positioned back to back and embedded in the plastic interlayer of an otherwise conventional laminated glass windshield.

This form of antenna gives adequate radio reception and, at the same time, is optically acceptable in a windshield because it does not materially affect the appearance or obstruct vision therethrough.

However the satisfactory performance of the antenna-windshields, and their wide acceptance by the public, has created production problems because of the necessity of applying the antenna wires to and embedding them in the plastic interlayers in precise patterns, and accurately repeating these patterns on successive sheets, as a large volume operation. Attempts to carry out the procedure with ordinary templates and hand operated tools proved unsuccessful because they were not only too slow to be economically feasible but also because they lacked the accuracy of uniform pattern reproduction from windshield to windshield necessary to pass the rigid inspection requirements for glazing these vital sight openings. At the same time there was no machinery available that was capable of performing the necessary steps automatically.

SUMMARY OF THE INVENTION

According to this invention however there is provided a method, and apparatus, for combining the plastic interlayer and antenna wire portions of laminated antenna-windshields quickly, smoothly and with the precision essential to meet production requirements in the automotive field.

An important object of the invention is the provision of a method and apparatus of this character that is capable of laying a length or lengths of wire, in a predetermined pattern, on and embedding them in successive plastic interlayer sheets as parts of a substantially continuous operation.

Another object is to provide such a method and apparatus whereby either a single or separate lengths of wire can be incorporated into each plastic sheet in separate patterns positioned side by side and in close proximity to one another.

Further and more detailed objects and advantages of the invention will become apparent in the course of the following description when taken in connection with the accompanying drawings.

BRIEF DESCRIPTION OF THE DRAWINGS

In the drawings, wherein like numerals are employed to designate like parts throughout:

FIG. 1 is a front elevation, from the operator's position, of the plastic supporting and wire laying apparatus of the invention;

FIG. 2 is a view similar to FIG. 1, but showing the wire laying apparatus shifted to a different station over the plastic supporting apparatus;

FIG. 4 is an enlarged view of the left hand side of the apparatus of FIG. 1;

FIG. 5 is a plan view of the apparatus of FIG. 4;

FIG. 7 is a transverse, vertical, sectional view taken substantially along the line 7—7 in FIG. 4;

FIG. 18 is a fragmentary, sectional view of the plastic supporting apparatus, taken substantially along the line 18—18 in FIG. 5, and showing in phantom lines the start of the wire laying procedure;

FIG. 19 is a view similar to FIG. 18 but taken along the line 19—19 and showing the end of the wire laying procedure.

DESCRIPTION OF THE PREFERRED EMBODIMENTS

Figure 6:
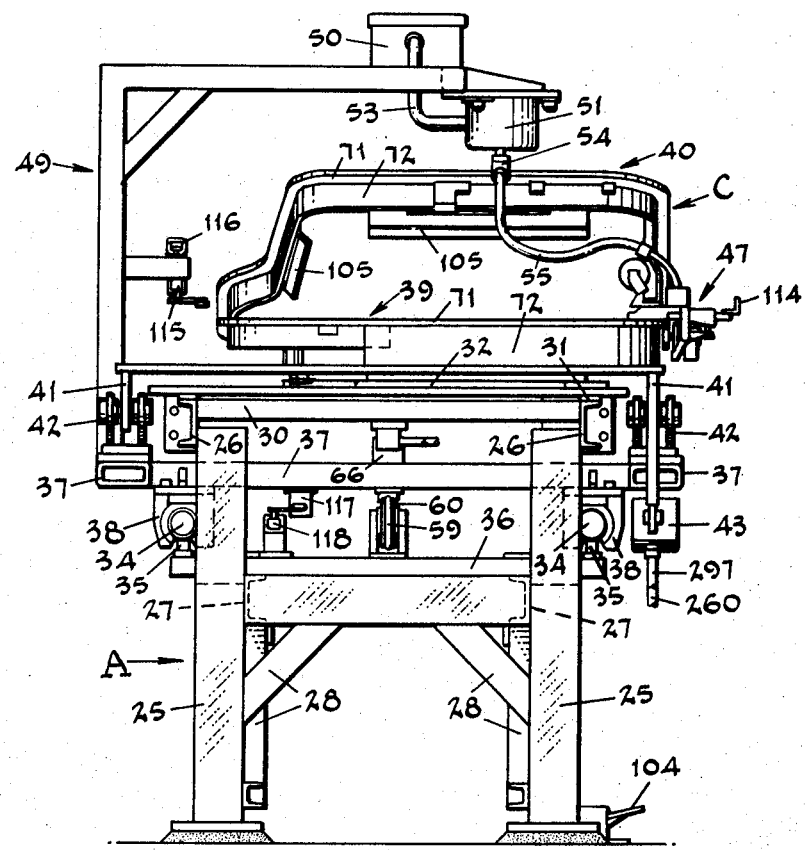
FIG. 6 is an end view of the apparatus of FIGS. 1, 4 and 5.

Referring now more particularly to the drawings, and as best shown in FIGS. 1, 2 and 4 through 9, in one form of the invention the apparatus phase may comprise a base or framework A which carries both a plastic supporting structure B and the supporting and operating mechanism for a wire laying apparatus C.

The base A is made up of a plurality of fixedly mounted vertical posts, including corner posts, 25 connected together at their upper ends by external, longitudinally extending, horizontal channel irons 26; and, intermediate their ends, by internal, horizontal channel irons 27 and angularly arranged braces 28 extending between the channel irons 27 and the posts.

The supporting structure B is essentially a table or the like and, as here shown comprises a solid top 29 which is rectangular in shape and is mounted on and spaced from the exterior channel irons 26, and a series of smaller channel irons 30 extending transversely therebetween, by spacer strips 31. The table 29 is of substantially the same length as the base or framework A but is somewhat wider so that it overlaps the base on opposite sides (FIG. 7) and, located on the surface of the table top adjacent its opposite ends, are patterns or templates 32 and 33 for receiving and locating the plastic sheets into which antenna wires are to be incorporated.

As also best shown in FIG. 7, the wire laying apparatus C is adapted to be supported for necessary movement over the table 29 on rod-like track or slide elements 34 extending along either side of the base A and supported, by brackets 35, on the ends of a series of relatively small channel irons 36 which are carried on and extend transversely of and overlap the larger internal, intermediate channel irons 27. The carriage of the wire laying apparatus C comprises a rectangular frame 37 of hollow beam construction located between the exterior upper and interior intermediate channel irons 26 and 27 and mounted for reciprocal movement along the slide members 34 by means of guides 38 depending from the frame 37 and embracing the slides.

The actual wire laying structure of the apparatus C includes a pair of track templates 39 and 40, pivotally mounted by means of supporting bracket arms 41 between post brackets 42 extending upwardly and outwardly from the frame 37, and swingable between the full and broken line positions shown in FIGS. 1 and 2 by air cylinders 43 carried by brackets 44 depending from the frame 37 and equipped with plungers 45 attached at their outer ends to the lower ends of the bracket arms 41.

Mounted in tandem for movement on and along each of the track templates 40 and 41 are a preheating head 46 and a wire laying head 47 connected together for movement as a unit by a flexible cable 48.

To supply necessary electrical power to the multiple, moving, heating, driving and control means of the apparatus just described, a gallows type frame 49 is mounted on the carriage frame 37 to extend upwardly and inwardly therefrom over the table 29 and support a junction box 50 above the gallows frame and distributor boxes 51 below the frame and at either side of the junction box. Current is supplied to the junction box 50, through primary feed lines 52, and fed therefrom, through cables 53, to the boxes 51 from which it is distributed through swivel power units 54 and cables 55 to the heating and feeding heads associated with the track templates 39 and 40.

Figure 8:
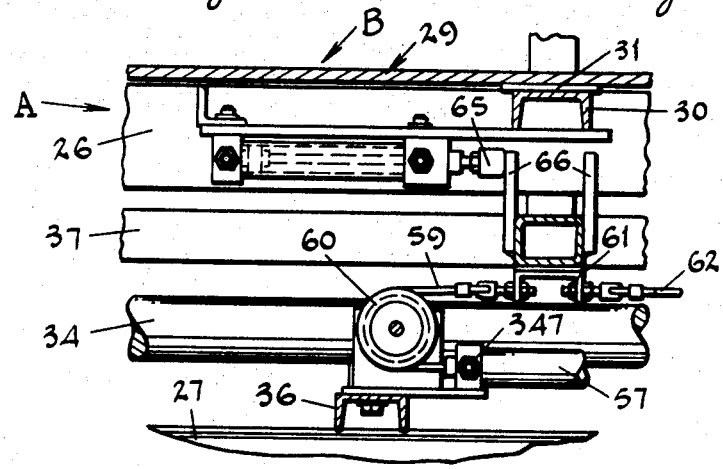
FIG. 8 is a fragmentary sectional view taken substantially along the line 8—8 in FIG. 7 and showing a detail of the shifting means for the wire laying apparatus.
Figure 9:
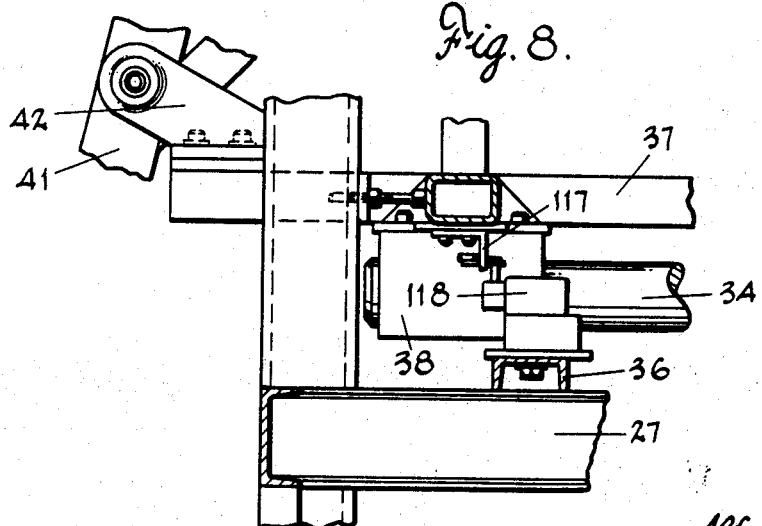
FIG. 9 is a fragmentary sectional view taken substantially along the line 9—9 in FIG. 7 and showing a control means for the carriage of the wire laying apparatus.

In employing the apparatus of the invention the carriage frame 37 of the wire laying apparatus C is reciprocated between the position illustrated in FIGS. 1, 4 and 5 (where the track templates 39 and 40 are over the pattern 32 at one end of the table 29), and the position shown in FIG. 2 (where the track templates are over the pattern 33 at the other end of the table). To accomplish this, a horizontally arranged hydraulic cylinder 57 is supported longitudinally of the base A between the sides thereof on the channel irons 35 and equipped with a piston 58 (FIG. 20) that is movable within the cylinder a distance substantially equal to the travel of the wire laying apparatus between the positions shown in FIG. 1 and FIG. 2. A cable 59, having one end secured to the piston 58, is trained over a pulley 60 and attached at its opposite end to one side of a channel shaped bracket 61 depending from the carriage frame 37 substantially centrally thereof. Similarly, one end of another cable 62 is attached at one end to the opposite end of the piston 58, trained about a pulley 63 and attached at its other end to the other side of the depending bracket 61 on the carriage frame 37. With this arrangement, upon actuation of the piston 58 within the cylinder 57 first in one direction and then in the other, the wire laying apparatus C will be moved back and forth between the position shown in FIG. 1 and that shown in FIG. 2 and will be smoothly and accurately located in either position at the end of its travel by shock absorbing hydraulic bumpers or stops 65 engageable by arms 66 extending upwardly from the carriage frame 37 (FIG. 8).

The purpose of reciprocating the wire laying apparatus C back and forth over the table 29 of the plastic supporting structure B is to permit the removal of a plastic interlayer into which antenna wire elements have been incorporated from, and/or the locating of an unwired interlayer on, the template or pattern at one end of the table 29 while wire antenna elements are being incorporated into still another plastic interlayer previously located on the pattern at the opposite end of the table.

To facilitate the locating of the plastic, and as best shown in FIGS. 5, 18 and 19, the patterns or templates 32 and 33, at opposite ends of the table top 29, are in the form of slightly raised platforms having a surface area or contour which coincides exactly with that of the plastic interlayer to be wired except that the pattern platforms have cut-out portions 68 for a purpose to be more clearly hereinafter explained.

To begin operation with the wire laying apparatus C in the position shown in FIG. 1, a sheet of plastic 67 (FIGS. 3, 5, 18 and 19) will be laid on the pattern 33 at the opposite end of the table 29 of the supporting structure B and located so that the edges of the plastic sheet coincide with the edges of the pattern platform. The wire laying apparatus C will then be moved to the position shown in FIG. 2, to bring it over the pattern 33, and then operated to incorporate wire antenna elements 69 and 70 (FIG.3) into the plastic sheet thereon. While this is being done, another plastic sheet will be located on the pattern platform 32 at the other end of the supporting structure B and, upon completion of the wire laying cycle over the pattern 33, the wire laying apparatus C will be returned to the FIG. 1 position over the pattern 32; whereupon the plastic sheet on the pattern platform 33, with the wire and elements incorporated therein, can be removed and a new sheet of plastic located on the pattern 33 while the apparatus C is embedding the antenna wires in the sheet of plastic on pattern 32.

The actual laying of the wire elements 69 and 70 on and the embedding of them into a plastic interlayer 67 on one of the pattern platforms 32 and 33, when the apparatus C has been positioned thereabove, is done by the heads 46 and 47 during travel along the track templates 39 and 40 at a time or times when the templates are in their lowered positions as shown in broken lines in FIGS. 1 and 2.

Figure 3:
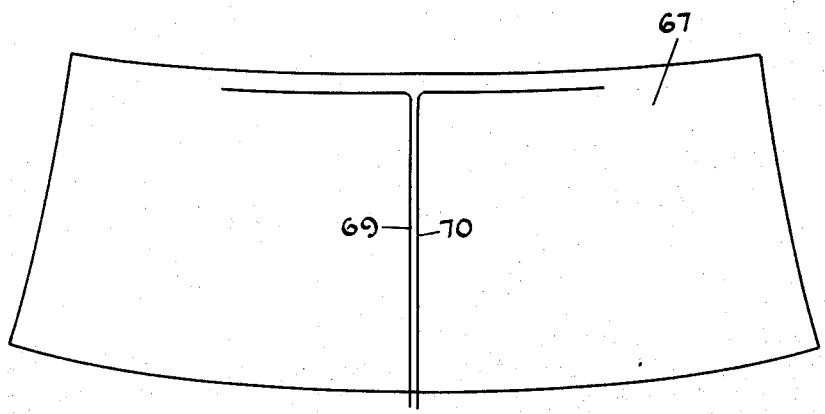
FIG. 3 is a plan view of a typical plastic interlayer for a laminated glass windshield into which antenna wires have been incorporated in accordance with one form of this invention.

However, in order to produce the antenna wire pattern shown in FIG. 3, and in which the vertical legs of the pattern are in such close proximity, the track templates 39 and 40 must be so located relative to one another that only one of them can be in its lowered or operative position at a time. Also, the heads 46 and 47 are preferably started from a position outside and in front of the pattern platform as shown in FIGS. 5 and 18, and preferably complete the operative portion of their travel above the cut out areas 68 (FIG. 5) of the platform as shown in FIG. 19.

Figure 16:
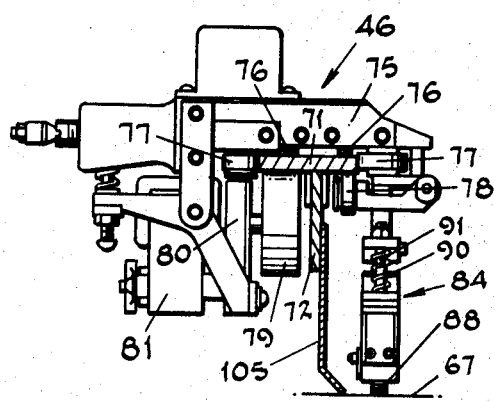
FIG. 16 is a side view of the preheater head, taken substantially along the line 16—16 in FIG. 4.
Figure 17:
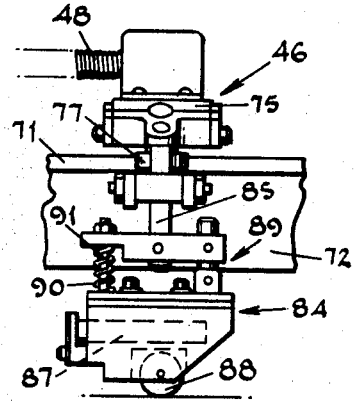
FIG. 17 is an end view of the structure of FIG. 16.
Figure 10:
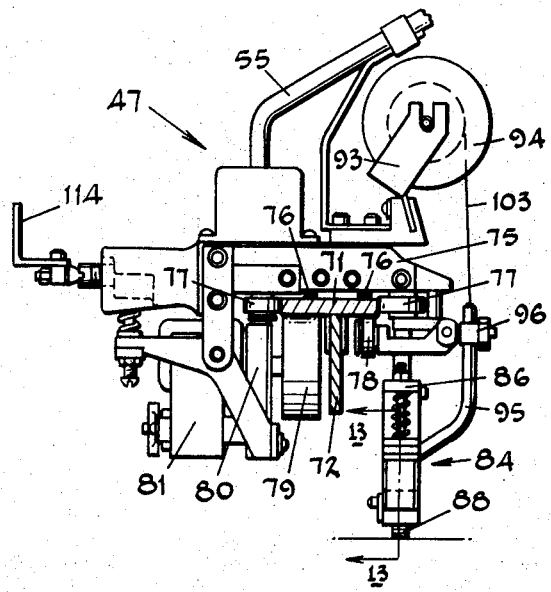
FIG. 10 is a side view of one of the wire laying heads taken substantially along the line 10—10 in FIG. 4.
Figure 11:
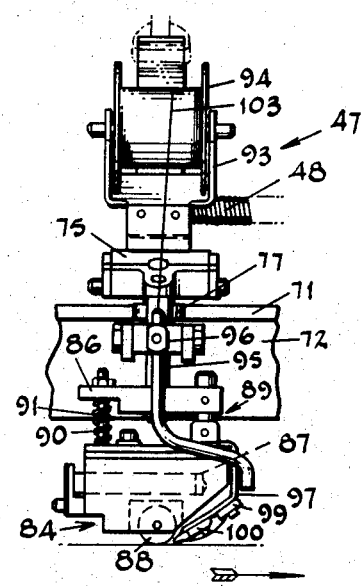
FIG. 11 is an end view of the head of FIG. 10.
Figure 12:
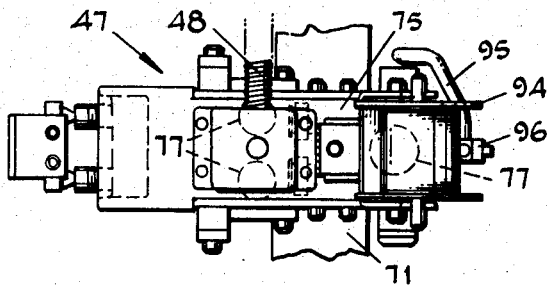
FIG. 12 is a plan view of the head of FIGS. 10 and 11.
Figures 13, 14:
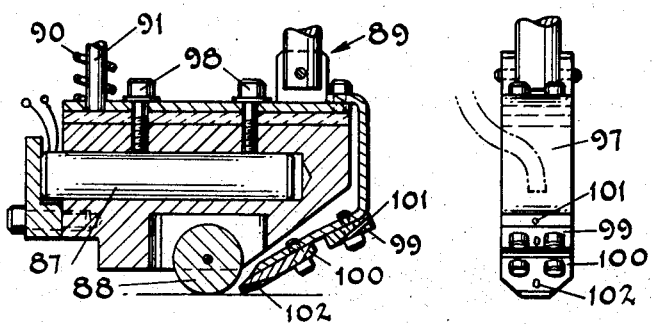
FIG. 13 is a vertical sectional view taken substantially along the line 13—13 in FIG. 10.
FIG. 14 is an end view of the apparatus of FIG. 13 from the right hand side and showing the tubular guide for the wire in phantom lines.

Thus, each of the track templates 39 and 40 is "T" shaped in cross section (FIGS. 10 and 16) with the generally horizontal cross piece 71 providing the actual track and the vertical piece 72 acting as a reinforcing and supporting member. As explained above one preheating head 46 and one pressure head 47 are connected together for movement in tandem and as a unit along each of the track templates and both types of heads are of the same general construction. For example, as best shown in FIGS. 10 and 16, both the preheater head 46 (FIG. 16) and the pressure head 47 (FIG. 10) comprise a body portion 75 which carries guide rollers 76 engaging the top surface of the track 71, guide rollers 77 engaging the opposite edges of the track, guide rollers 78 engaging the bottom of the track at one side of the vertical bracing member 72, and a drive roll 79 engaging the bottom of the track at the other side of the vertical reinforcing member. Certain of the guide rollers may be spring pressed or otherwise resiliently mounted to insure proper moving contact with and/or gripping of the track between oppositely disposed rollers; and the drive roll 79 is connected through suitable transmission means within a gear box 80 to a motor 81 hung from the body portion 75 and providing the operating means for driving its respective head around its respective continuous track template.

The preheating and pressure heads 46 and 47 respectively are also similar in that they are provided with a housing 84 extending parallel with the track template, at right angles to the body portion 75 and suspended therefrom by means of a rod 85 and cross piece 86 (FIGS. 11, 13, 16 and 17). Supported within the housing 84 is a resistance heater 87 located in sufficiently close proximity to a contact roll 88 that is mounted for rotary movement within the housing to heat the same. To insure the heated roll 88 pressing against the plastic with sufficient force, the roll and heater housing 84 is swingably hung from one end of the cross piece 86 as shown at 89 while the opposite end of the housing is continually being urged downwardly by the action of a spring 90 in surrounding relation to a rod 91 fixed to the housing and extending upwardly loosely through the cross piece 86. The upper end of the rod 91 is threaded and carries a nut 92 for limiting the extent of downwardly swinging movement of the housing 84.

In fact the principal structural difference between the preheating heads 46 and the pressure heads 47 is that the latter are additionally provided with means for carrying a supply of antenna wire and for feeding it to and guiding it beneath the heated rolls 88 associated therewith. Thus, as illustrated in FIGS. 10 to 14, each of the so-called pressure or wire laying heads 47 has a bracket 93 carried on top and at the inner end of the body portion 75. A roll 94 of antenna wire is mounted for rotation on and so positioned relative to the bracket 93 that wire can easily be drawn therefrom toward a serpentine tube 95 that is secured to the inner end of the body portion by a fastener 96 to extend downwardly and angularly so as to position its lower end in front of the leading end of the housing 84 and spaced upwardly from the bottom thereof. Also located in front of the leading end of the housing 84, between it and the lower end of the tube 95, is an angularly shaped guide plate or bracket 97. The upper end of the plate 97 is secured to the top of the housing 84 by machine screws 98 so that the plate extends downwardly therefrom and substantially parallel with the upper straight portion of the leading end of the housing then at an inwardly directed angle along the angled lower portion of the housing to a position just ahead of the roll 88; and secured to the lower surface of angularly directed lower portion of the plate 97 by machine screws 101 are upper and lower cross members 99 and 100 respectively which are provided with narrow passageways 101 and 102 extending through the members 99 and 100 from the forward edge to the lower face of the former and from the lower face to the rearward edge of the latter.

To prepare the wire laying means for use, wire 103 is threaded from the reel 94 through the tube 95 and thence through the passages 101 and 102 into position beneath the pressing roller 88 so that, upon movement of the laying or pressing head 47 over a sheet of plastic and when the roll 88 is in pressing contact therewith, wire will be continuously drawn from the reel 94 laid onto the plastic surface and embedded therein by rolling contact of the roll 88 with the plastic sheet.

More specifically, and considering the wire laying apparatus C as just having reached the position shown in FIGS. 1 and 4 with the track templates 39 and 40 swung up into inoperative position above the pattern platform 32 upon which a plastic interlayer 67 has already been placed in position for wiring, leaving the pattern platform 33 (FIG. 5) at the other end of the table 29 open for removal of a wired interlayer from and/or positioning of an unwired interlayer thereon, operation of the device will have been instituted by the operator's stepping on a foot pedal 104 which, by electrical means to be more clearly hereinafter described, has resulted in the apparatus C reaching its present position. Here a depending arm 117 from the carriage 37 (FIGS. 4 and 6) has engaged a limit switch 118 to cause the piston 45, associated with the track template 39, to move within the cylinder 43 and swing the template from the full to the dotted line position shown in FIG. 1. Downward movement of the track template causes spring metal hold down members 105 depending therefrom to engage the plastic sheet or interlayer 67 on the pattern platform 32 and maintain it securely in position as shown in FIGS. 7 and 16.

At this time all parts of the properly located and secured plastic interlayer 67 are fully supported in position to be acted upon by the heads 46 and 47 except the parts that lie over the cut out portions 68 and there, as shown in FIGS. 5 and 19, the plastic drapes down from the pattern platform onto the top of the table 29. Also at this time, as shown in FIG. 5, the heads 46 and 47 are spaced forwardly of the plastic and the pattern platform and outwardly of both the framework A and the plastic supporting structure B.

With the track template 39 swung down the motors 81 associated with the heads 46 and 47 thereon are energized to move both heads to the right along a straight stretch of the track template. As the heads travel into the first curve in the track template 39 they will be moving toward the forward edge of the raised pattern platform upon which the interlayer is supported (FIG. 5) and, to cause the rollers 88 of both heads and the wireguide means on the head 47 to move smoothly up from its lowered, non-operating position to its raised operative position there is provided (FIG. 18) between the forward edge of the table 29 and the forward edge of each of the pattern platforms 32 and 33 a ramp 106 preferably of a resilient material and which may be supported at its higher end on a block of rubber or the like 107 and folded over and adhered to the table margin at its lower end as shown at 108.

Continued movement of the heads brings first the preheating head 46 and then the pressing and laying head 47 up the ramp 106 onto and over the plastic interlayer 67 on the platform 32. Because of the gradually increasing pressure by the wheel 88 of the wire laying head 47 as it moves up the inclined ramp it begins laying down wire from the reel 94 while still on the ramp leaving an end 109 thereof off and spaced from the edge of the plastic interlayer sheet 67.

As the heads move onto and over the interlayer the heated wheel 88 of the leading preheat head 46 heats and softens the surface of the plastic along a path in advance of the head 47 and onto this heated path a length of wire is laid by the heated roll 88 of the head 47, which roll also acts to press and so embed the wire into the heated plastic. During travel of the heads over the plastic interlayer and along the track template 39 to the cut out portion 68, wire from the reel 94 is fed to laid on and embedded in the surface of the plastic in the pattern shown rate at 69 in FIG. 3. In moving into the area over the cut out portion 68 the wire laying roll 88 in the head 47 passes over the upstanding blade 111 of a knife 112 mounted for adjustment toward and away from the platform 32 on a bracket 113. This cuts the wire at the desired point (FIG. 19) and, since immediately thereafter the feed roll is out of contact with any surface, feeding of the wire is discontinued while the heads 46 and 47 continue to travel around the track template 39 to their starting position as shown in FIG. 5.

During such travel an angle arm 114 on the head 47 actuates a switch 115, carried on a bracket 116 extending inwardly from the gallows frame 49, which causes the track template 39 to be swung upwardly from the broken to the full line position shown in FIG. 1 and the template 40 to be swung downwardly from its angular, inoperative position shown in that figure to its horizontal operative position.

Figure 15:
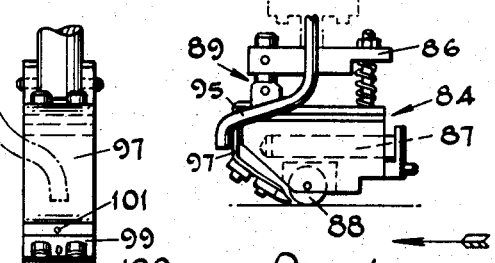
FIG. 15 is a view similar to FIG. 11, but of the other wire laying head; and with the parts that are identical in both heads shown in phantom lines.

Immediately thereafter the motors 81 of the heads 46 and 47 associated with the track template 40 are actuated to drive the connected heads to the left along the track and over the plastic interlayer to lay and embed the wire antenna element 70 (FIG. 3) in precisely the same manner as described above except that, there, the heads were moved to the right. As already explained the heads 46 and 47 associated with the track template 39 are identical with those associated with the track template 40 except that, because the heads on the former move to the right around the template and those on the latter move to the left, certain parts of corresponding heads are reversed. Thus, FIGS. 16 and 17 of the drawings are views of the preheat heads, and FIGS. 10 to 14 are views of the laying and pressing heads, associated with track template 40. However, FIG. 15 is an end view of the laying and pressing head associated with track template 39 with the portions that are identical in both structure and positioning shown in broken lines; and, by comparing this with the end view of the laying head associated with the template 40 in FIG. 11 it will be readily seen that the only difference between the heads shown in the two figures is in the reversal of parts necessary to permit the heads to travel in opposite directions as they follow identical but reversed paths around their respective track templates.

When the track template 40 has been raised to bring the two track templates into their raised positions shown in FIG. 4, the piston 58 is caused to operate within the cylinder 57, by the introduction and removal of fluid through the pipes 336 and 347 (FIGS. 7 and 20) which will move the wire laying apparatus C from the full line position of FIG. 1 to that of FIG. 2. When this has been done the track templates 39 and 40 are successively lowered and raised and the heads 46 and 47 associated with each moved around their track templates to lay on and embed antenna wire elements 69 and 70 (FIG. 3) into a plastic interlayer 67 on the pattern platform 33 in the manner that has just been described above for incorporating the wire antenna elements into the interlayer on the pattern platform 32 at the other end of the table 29.

At the same time with the laying apparatus C at the opposite end of the table there will be easy access to the pattern platform 32 to permit the wired interlayer to be removed therefrom and an unwired one to be properly positioned for the return of the apparatus C into operative position thereover.

It will be apparent that uninterrupted repetitions of the procedures just described will result in a substantially continuous process of incorporating wire antenna elements into plastic interlayers for laminated glass windshields and that the plastic sheets when so wired can be placed between two sheets of glass and the layers of the assembly laminated together into a unitary structure by regular commercial procedures to produce antenna windshields of laminated glass.

Figure 20:
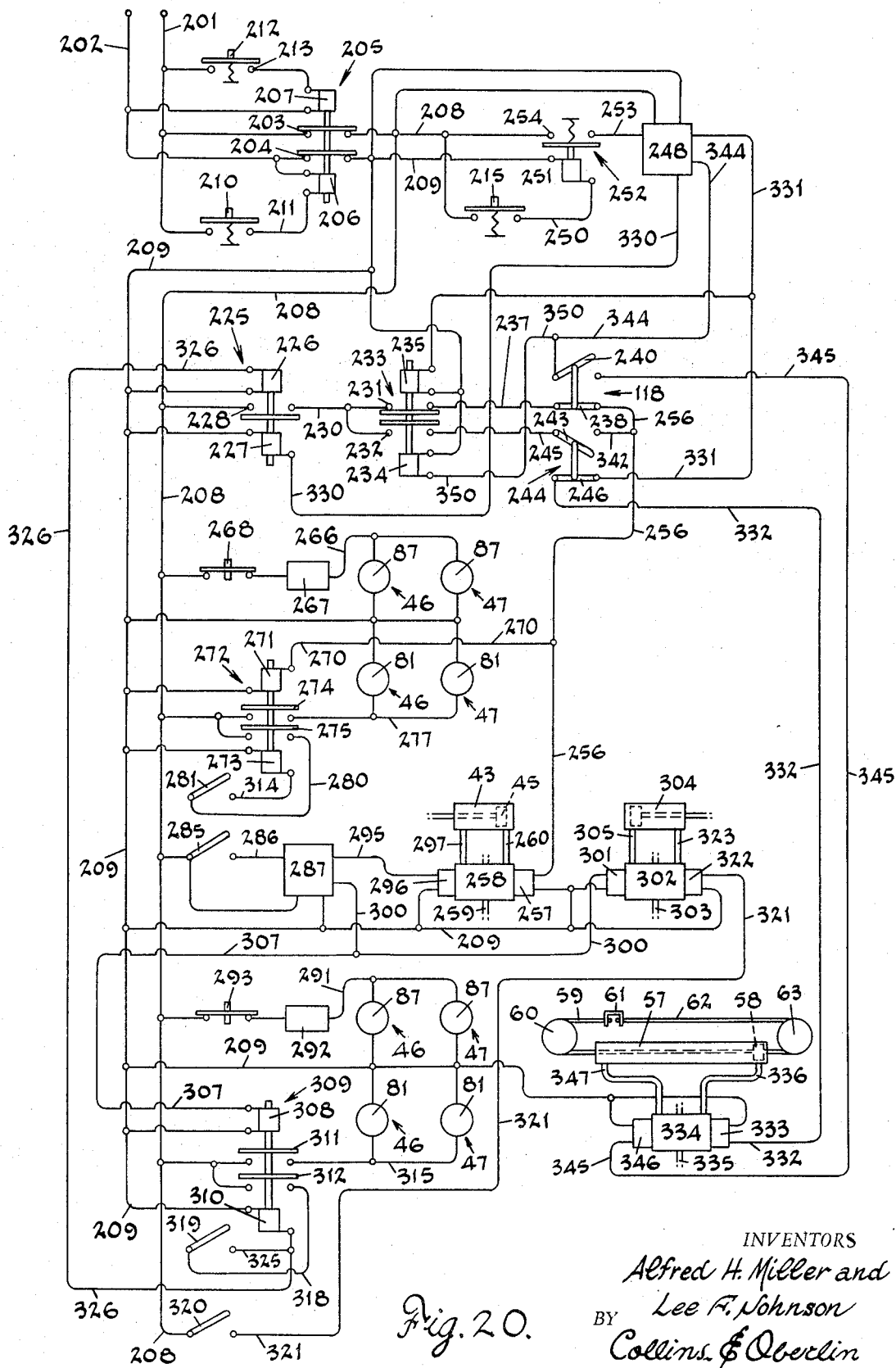
FIG. 20 is a wiring diagram for one form of automatic electrical control system that can be employed in operating the apparatus of the invention.

It will also be appreciated that operation of the entire apparatus as herein shown and described can be made optionally automatic in a number of specifically different ways. For example there is illustrated in FIG. 20 a schematic wiring diagram in which circuits from source lines 201 and 202 are made through engaged pairs of contacts 203 and 204 of a relay switch 205, having opposed solenoids 206 and 207, to service lines 208 and 209. The solenoid 206 is adapted to be energized, upon closing of normally-open manual control switch 210, by a circuit through line 211, to disengage contact pairs 203 and 204; while solenoid 207 is adapted to be energized by manual control switch 212 which, when closed, completes a circuit through line 213 to re-engage the contact pairs.

With this arrangement, to continue automatically the operation of the device as described above, the pedal 104 of the operator's foot switch 215 may again be employed to initiate a full cycle of operation which involves reciprocal movement of the carriage frame 37 of the laying apparatus C between the positions of FIG. 1 and FIG. 2; laying of a first wire by the heads 46 and 47 of the track template 39; laying of the second wire by the heads of the track template 40 and halting of the cycle. To accomplish this, there is a relay switch 225, having opposed solenoids 226 and 227 and contact pair 228, that is adapted to produce starting and stopping of each cycle of operation. Thus contact pair 228 close and open the circuit of service line 208 to line 230 connecting to one side of contact pairs 231 and 232 of relay switch 233 having opposed solenoids 234 and 235. Contact pair 231 extend the circuit of lines 201-230 to line 237 connecting to one side or switch 238 limit switch 118 which also has a second side or switch 240. With the carriage 37 positioned as in FIG. 1, limit switch 118 is held to close switch 238. Similarly, a switch 243 of limit switch 244 is connected by line 245 to one side of contact pair 232, with limit switch 244 also including a second switch 246. The switches of limit switch 244 are adapted to be actuated when the carriage 37 arrives at the second position as shown in FIG. 2. Alternate completion of line 230 through either contact pair 231 or 232 is controlled by the operation of foot pedal 104 which initiates operation of a counting relay 248.

In a previous cycle movement of the carriage frame 37 from the position of FIG. 2 back to that of FIG. 1, resulted from closing of switch 215 to complete the circuit of service line 208 to line 250 through the solenoid 251 of a spring-biased relay switch 252 to service line 209 to momentarily make a circuit by line 253 through engaged contact pair 254 to counting relay 248, in series with service lines 208 and 209. As a result and as will shortly be more fully explained in the cycles of operation, counting relay 248 has caused the engagement of contact pair 228 of relay switch 225 and contact pair 231 of relay switch 233.

Since the arm 117 on carriage 37 is holding switch 238 of limit switch 118 engaged, a circuit will be made from service line 208 and lines 230-237 through the closed switch 238 of limit switch 118 and line 256 through the end 257 of valve 258, to service line 209, to direct pressure from supply pipe 259 and pipe 260 to the head end of cylinder 43. This operates to lower the track template 39 to the horizontally disposed position indicated in broken line (FIG. 1).

During normal, continuous operation of the apparatus, the heaters 87 of the preheat head 46 and wire-laying head 47 are connected by line 266 through a variable resistor 267 and on-off manual switch 268 to service line 208.

Substantially simultaneously with completion of line 256, a circuit is made therefrom by line 270 through the solenoid 271 of relay switch 272 to service line 209; relay switch 272 having opposed solenoid 273 and pairs of contacts 274 and 275. While engaged, contact pair 274 complete a circuit via line 277 to traction motors 81 for the preheat head 46 and the wire-laying head 47. Engaged contact pair 275, on the other hand, make a circuit from service line 208 and line 280 to one side of a limit switch 281.

At the end of the first wire-laying operation and immediately after the wire is cut, an actuator plate on the wire-laying head 47 engages a limit switch 285 that is adapted to cause the track template 39 to move to the "up" position, track template 40 to move to the "down" position and to initiate operation of the heads 46 and 47 associated with track template 40. For these purposes, limit switch 285 is connected by line 286 to timing relay 287, in series with service lines 208 and 209. Also heaters 87 for these heads are connected by line 291 through variable resistor 292 and on-off manual switch 293 to service line 208.

Timing relay 287 makes a circuit by line 295 through the end 296 of valve 58 to source line 202 thereby directing pressure by pipe 297 to the rod end of cylinder 43. Timing relay 287 then completes a circuit by line 300 through the end 301 of valve 302 to service line 209 to connect supply pipe 303 to the head end of cylinder 304 by pipe 305. This will locate the track template 40 in a substantially horizontal position as shown in broken lines in FIG. 2. Extension line 307 from line 300 makes a circuit through solenoid 308 of relay switch 309 to service line 209; relay switch 309 having opposed solenoid 310 and pairs of contacts 311 and 312.

When heads 46 and 47 of track template 39 arrive at their rest or "home" position, limit switch 281 is engaged to complete a circuit by line 314 through opposed solenoid 273 of relay switch 272 to service line 209 to cause disengagement of contact pairs 274 and 275. Disengagement of contact pair 274 will halt operation of traction motors 81 for heads 46 and 47 while disengaged contact pair 275 will open the circuit of limit switch 281 from service line 208 via line 280.

When engaged, upon energization of solenoid 308, contact pair 311 of relay switch 309 make a circuit from service line 208 and line 315 through the traction motors 81 for heads 46 and 47 of track template 40. The associated contact pair 312 create a circuit from service line 208 and line 318 to one side of limit switch 319. At the end of the second wire-laying operation and after cutting of the wire, an actuator plate on the wire-laying head 47 engages limit switch 320 to make a circuit by line 321 through the end 322 of valve 302 to service line 209. This will cause direction of pressure by pipe 323 to the rod end of cylinder 304 to raise the track template 40 to the "up" position as shown in full line in FIG. 2.

When limit switch 319 is engaged as the heads 46 and 47 reach their rest or "home" positions, a circuit is made by line 325 through opposed solenoid 310 or relay switch 309 to service line 209 thereby to disengage contact pairs 311 and 312. While contact pair 311 open the circuit of line 315 to motors 81, contact pair 312 similarly open the circuit of limit switch 319 from service line 208 through line 318. Branch line 326 extends the circuit of line 325 through the solenoid 226 of relay switch 225 to service line 209. This operates to disengage contact pair 228 to open the circuit of line 230 from service line 208. In this respect, disengagement of contact pair 226 serves to render the sequences of automatic operation of the apparatus inactive.

Having placed a sheet of plastic on the pattern platform at the second station or position, and the heads 46 and 47 on the track templates 39 and 40 having completed the laying of the two wire elements at the first position or station, the operator may momentarily close foot-actuated switch 215 to create the circuit by line 250 through the solenoid 251 of spring-biased relay switch 252 to service line 209. While engaged, contact pair 254 make the circuit of line 253 to counter relay 248 which is primarily involved with movement of the carriage bodily from the first position or station (FIG. 1) to second position or station (FIG. 2). Thus, counter relay 248, in a first step of operation, establishes the circuit of a line 330 through the solenoid 227 of relay switch 225 to source line 202. This restores the circuit of service line 208 to line 230 at contact pair 228. Counter relay 248 then establishes a circuit by line 331 through presently engaged switch 246 of limit switch 244 and line 332 through the end 333 of valve 334 to service line 209 thereby applying pressure from supply pipe 335 and pipe 336 to the cylinder 57 and moving the contained piston 58 to the opposite end thereof. This will cause the cable 62 to advance the carriage frame 37 from the first to the second position.

In the event the foot switch 215 is inadvertently actuated while an operator is placing a sheet of plastic on the pattern platform movement of the carriage frame would be started. However, to avoid such undesired movement and striking of the operator, the safety switch 210 can be immediately operated and halts all operation of the apparatus by breaking the circuits of source lines 201 and 202 to service lines 208 and 209 at the disengaged pairs of contacts 203 and 204 of relay switch 205. To resume operation of the apparatus, the operator can restore the circuits of source and service lines by use of another manual switch 212.

By line 340, the circuit of line 310 is also extended through solenoid 235 of switch 233 to service line 209 which will disengage contact pair 231 and re-engage contact pair 232. This will establish the circuit from service line 208 by line 245 to one side of presently open switch 243 of limit switch 244.

When the carriage frame 37 arrives at the position of FIG. 2, limit switch 244 will be actuated to initially open switch 246 which will break the circuit of lines 331-332 and neutralize the valve 334. Upon closure of switch 243 of switch 244, line 245 is completed to line 342 which is connected into the circuits of lines 256 and 270. As previously described, the circuit of line 256 is adapted to cause lowering of the track template 39 while the circuit of line 270 becomes effective to cause operation of the traction motors 81. As in the first instance, closure of switch 285 is again instrumental in raising the track template 39, lowering of the track template 40, and producing operation of the motors 81 for the heads 46 and 47. When limit switch 320 is closed, the circuit of line 321 is restored to valve 302 whereupon the track template 40 will be raised to its "up" position. Also, upon closure of switch 319, operation of motors 81 will be brought to a halt and the circuit of service line 208 through contact pair 228 of relay switch 225 will be again opened by the circuit of line 326 through the solenoid 226 of switch 225 to service line 209.

Then when the operator next actuates foot switch 215, counter relay 248 will temporarily restore the circuit of line 330 to bring about re-engagement of contact pair 228 of switch 225 and then create a circuit by line 344 through the then closed switch 240 of switch 239, which is then opened at switch 238, and line 345 through the end 346 of valve 334 to source line 202 to direct pressure by pipe 347 to cylinder 57 behind the piston 58 thereby producing return movement of the carriage frame 37 from the second position to the first position. Branch line 350 from line 344 makes a circuit through the solenoid 234 of switch 233 to service line 209 to disengage contact pair 232 and re-engage contact pair 231. When the carriage arrives at said first position, limit switch 239 will be engaged to re-close switch 238 while opening switch 240. The circuit of lines 344-345 will thus be opened at switch 240 to neutralize the valve 334. Consequently, the completion of lines 230 and 237 via switch 238 to line 256 will bring about operation of valve 258 to lower the track template 39 and start traction motors 81 of the heads 46 and 47. Upon subsequent actuation of limit switch 285, the track template 39 will be raised and the track template 40 lowered, as hereinbefore described, to carry out the second wire-laying operation.

It will be appreciated that, while the electrical circuits as just described constitute a preferred form of operating and control system for providing substantially continuous operation of the antenna wire incorporating apparatus of this invention, they can be readily modified so that repetition of full cycles of operation will be automatic rather than operator controlled to make the procedure a completely continuous one.

Similarly, while the steps of heating the plastic to soften it along a predetermined path, laying the wire in a pattern coinciding with this path, and pressing the wire into the softened plastic have been illustrated as individual steps progressively performed by what can be considered separate pieces of apparatus, they can also, if somewhat less effectively, be carried out with a combined heating, laying and pressing device operating progressively or otherwise.

In fact it is to be understood that the forms of the invention herewith shown and described are to be taken as illustrative embodiments only of the same, and that various changes in the shape, size and arrangement of parts, as well as various procedural changes may be resorted to without departing from the spirit of the invention as defined in the following claims.

We claim:

1. In apparatus for incorporating wire antenna elements into plastic sheets to be used as interlayers for laminated safety glass, a table, areas on said table for supporting and locating said plastic sheets, a wire laying apparatus including a carriage frame mounted for movement along said table into and out of operative association with each of said support areas, a pair of track templates carried in opposed relationship to one another on said carriage for swinging movement into and out of operative position above a plastic sheet mounted on one of said support areas, a head mounted on each of said track templates for movement therealong, a roll swingably mounted from said head for contacting engagement with said plastic sheet, means resiliently urging said roll toward said sheet, means for heating said roll, a holder for a supply of wire also carried by said head, and means for directing wire from said holder below said roll.

2. Apparatus as defined in claim 1 in which second heads are mounted for movement along said track templates in advance of said first heads, rolls are associated with said second heads and mounted for resilient contact with said plastic sheet, and means is provided for heating said last mentioned rolls.

3. Apparatus as defined in claim 1 in which means is provided for initiating and automatically performing in timed relation to one another a complete sequence of steps including swinging one of said track templates into operative position after said carriage is in operative association with one of said platforms, driving said head associated therewith along said one track template, swinging said one track template out of operative position, swinging the other of said track templates into operative position, driving said head associated therewith along said other track template, swinging said other track template out of operative position, and moving said carriage into operative association with another of said platforms.

4. Apparatus as defined in claim 1 in which said support areas are surfaces of platforms carried by said table, and said table is provided with ramps in the path of said rolls leading up to said platform surfaces.

5. Apparatus as defined in claim 4 in which said platform surfaces have cut out areas also in the path of said rolls which leave plastic sheets carried thereby unsupported beyond the points where said wire is to be laid, and a cutting edge is positioned to be engaged by said rolls as they travel beyond said supporting surfaces and over said cut out areas.

6. Apparatus as defined in claim 5 in which resilient hold down members are mounted to depend from said track templates in positions to engage said plastic sheets when said track templates are swung into operative position.

* * * * *